Nov. 9, 1948.　　　　C. C. RONE　　　　2,453,385
HAMBURGER GRILL
Filed May 29, 1946　　　　　　　　　2 Sheets-Sheet 1
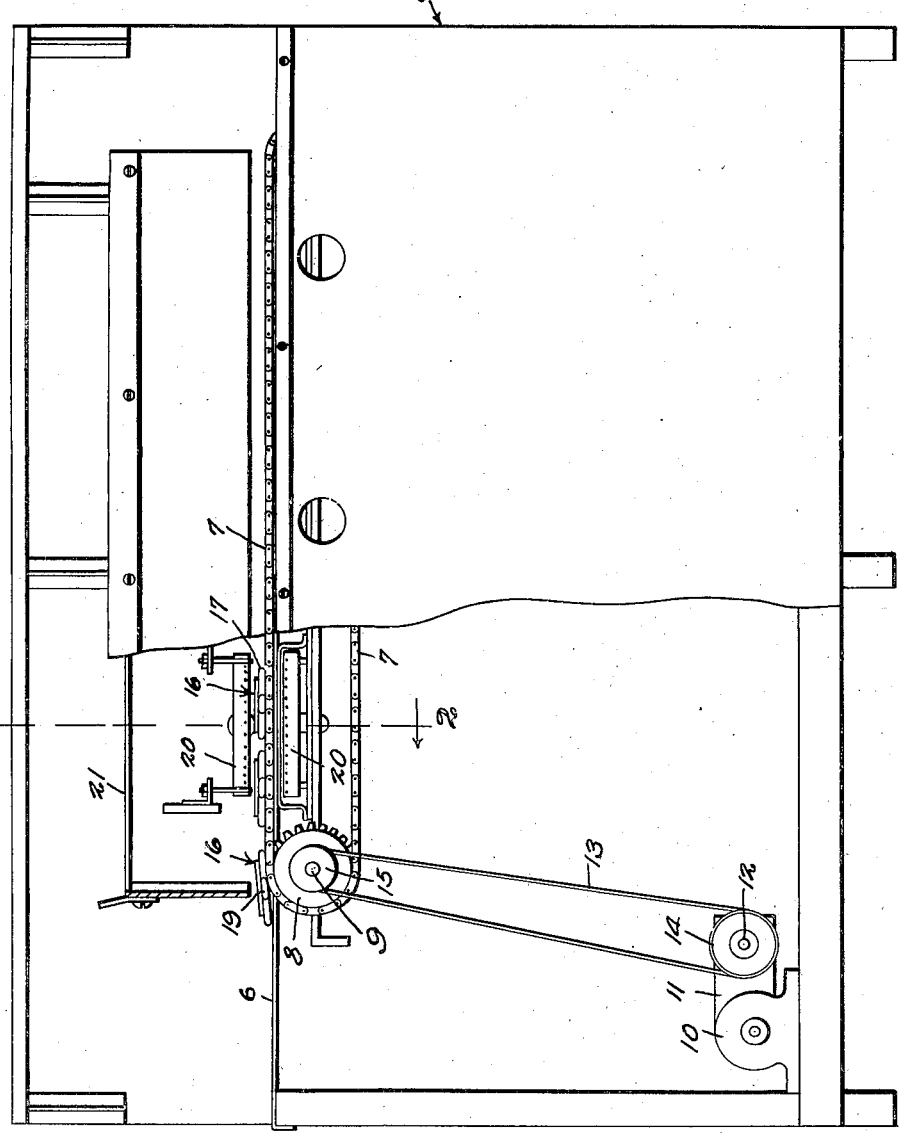
Inventor
C. C. Rone
By
Attorneys.

Nov. 9, 1948.     C. C. RONE     2,453,385
HAMBURGER GRILL
Filed May 29, 1946     2 Sheets-Sheet 2
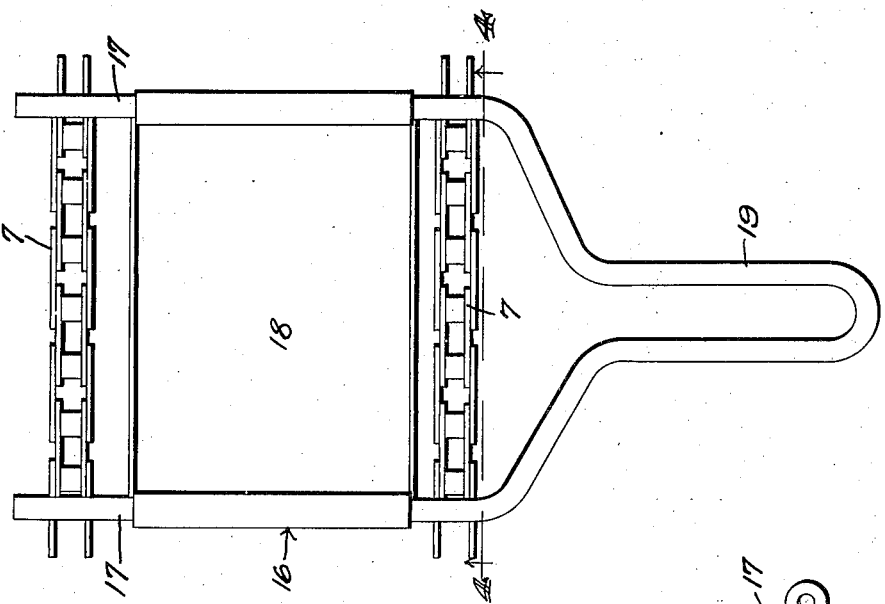
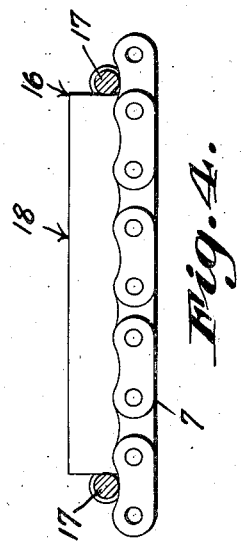
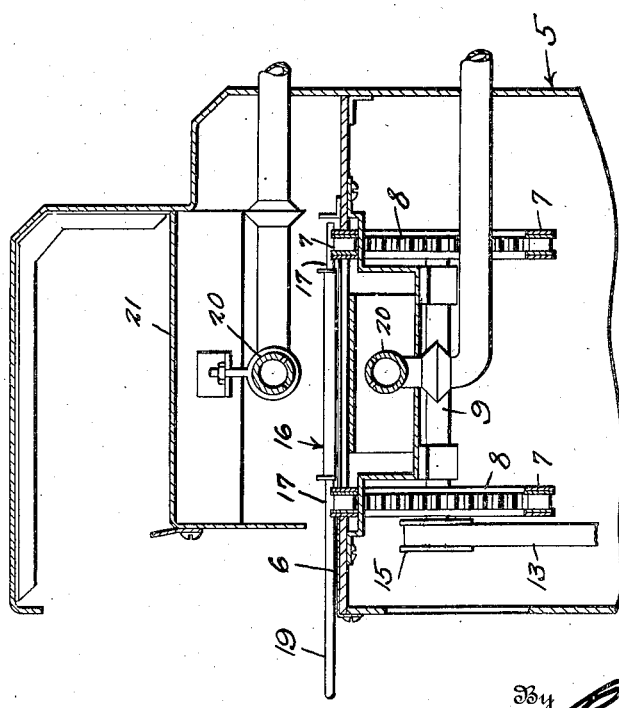
Inventor
C. C. Rone Patented Nov. 9, 1948

2,453,385

UNITED STATES PATENT OFFICE 2,453,385

HAMBURGER GRILL

Charles C. Rone, Lakeland, Fla., assignor to Roll-On Grill, Inc., a corporation of Florida Application May 29, 1946, Serial No. 673,045

1 Claim. (Cl. 99—423)

This invention relates to a grill, especially designed for use in grilling hamburgers or the like, the primary object of the invention being to provide a grill embodying a movable support on which the hamburgers or meat being grilled, are supported and moved past burners supplying heat to grill the articles.

An important object of the invention is to provide a movable support which is so timed that when the hamburgers or meat to be grilled have passed throughout the entire length of the grill, they will be properly cooked ready to be eaten.

Another object of the invention is to provide trays so constructed that they are removably supported on the chains or endless carriers operating through the grill, the trays being supplied with handles so that a tray may be removed at any point along the run of the endless carrier to the end that the hamburgers may be selected according to the degree of cooking, by removing the trays and contents of the trays prior to completing the passage through the grill.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawings:

Figure 1 is an elevational view of a grill constructed in accordance with the invention, a portion of the front wall of the grill having been removed, illustrating the construction of the endless carriers.

Figure 2 is a sectional view taken on line 2—2 of Figure 1.

Figure 3 is a plan view of one of the trays, showing the tray as positioned on the endless carrier.

Figure 4 is a sectional view taken on line 4—4 of Figure 3.

Referring to the drawings in detail, the grill comprises a casing, indicated generally by the reference character 5, which may be of any desired construction, the case being formed with a table 6.

The table 6 is provided with openings through which the endless chains 7 operate, the endless chains moving in parallel spaced relation with respect to each other, providing an endless carrier.

These chains 7 operate over the sprockets 8 mounted on the shaft 9 at one end of the machine, the shaft 9 constituting the power shaft. The chains 7 also operate over similar sprockets at the rear end of the casing, the latter sprockets being idle sprockets.

The reference character 10 indicates an electric motor that supplies power to the shaft 9, through the chain of reduction gearing mounted within the housing 11, shaft 12 and belt 13, the belt 13 operating over the pulley 14, mounted on shaft 12, and the pulley 15 mounted on shaft 9.

The sprockets over which the endless chains 7 operate, are of such diameters that the upper flight of each chain operates in a plane above the surface of the table for the reception of the trays 16 on which the hamburgers or meat being grilled are positioned.

Each of these trays includes a pair of arms 17 on which the metal pan 18 is secured, the metal pan being of a length equal to the distance between the arms 17. Portions of the arms 17 extend beyond the front and rear edges of the pan, providing supports for the tray, the arms resting on links of the chains, which chains carry the trays together with material being grilled, throughout the length of the casing.

A handle indicated at 19 forms a part of each tray and provides means whereby the trays may be conveniently placed on the endless carrier or removed therefrom.

The reference character 20 indicates burners which are arranged above and below the table top to supply heat for heating or grilling the hamburgers positioned on the tray.

Directly above the upper burners is a shelf 21 that is heated by the heat from the burners, so that buns or hamburger rolls positioned thereon may be maintained hot to be used in hamburger sandwiches with the hamburgers grilled in the machine.

From the foregoing it will be seen that due to the construction shown and described, I have provided a grill which will accomplish the grilling of a great number of hamburgers by its continuous operation, and one wherein the hamburgers may be removed by lifting the trays from the conveyor at various points, to the end that hamburgers of various cooked degrees whether rare or well done, may be had.

Having thus described the invention, what is claimed is:

A grill of the class described, comprising the combination with a conveyor embodying spaced parallel chains including links having inwardly curved edges, the upper run of the conveyor passing between burners, of a plurality of trays, each tray embodying substantially U-shaped members providing spaced arms, a pan connected with the arms, portions of the arms extending beyond the front and rear edges of the pan adapted to rest on the curved edges of the links of the conveyor chain normally holding the trays against movement with respect to the conveyor, and said arms providing a handle extending beyond the front of the grill, by means of which the trays are removed from the conveyor and placed thereon.

CHARLES C. RONE.

REFERENCES CITED

The following references are of record in the file of this patent:

UNITED STATES PATENTS

| Number | Name | Date |
|---|---|---|
| 1,458,021 | Bamford | June 5, 1923 |
| 1,618,587 | Grady | Feb. 22, 1927 |
| 2,040,996 | Hungerford | May 19, 1936 |
| 2,259,073 | McGlaughlin | Oct. 14, 1941 |
| 2,369,274 | Beatty | Feb. 13, 1945 |

FOREIGN PATENTS

| Number | Country | Date |
|---|---|---|
| 25,232 | Great Britain | 1899 |
| 509,011 | Great Britain | July 6, 1939 |